United States Patent
Fujiki

(10) Patent No.: US 10,479,639 B2
(45) Date of Patent: Nov. 19, 2019

(54) IMAGE PROCESSING APPARATUS AND IMAGE PROCESSING METHOD

(71) Applicant: FUJI XEROX CO., LTD., Tokyo (JP)

(72) Inventor: Ryuji Fujiki, Kanagawa (JP)

(73) Assignee: FUJI XEROX CO., LTD., Minato-ku, Tokyo (JP)

(*) Notice: Subject to any disclaimer, the term of this patent is extended or adjusted under 35 U.S.C. 154(b) by 0 days.

(21) Appl. No.: 16/002,181

(22) Filed: Jun. 7, 2018

(65) Prior Publication Data
US 2019/0112146 A1    Apr. 18, 2019

(30) Foreign Application Priority Data

Oct. 16, 2017  (JP) ................................ 2017-200301

(51) Int. Cl.
| | |
|---|---|
| B31F 1/08 | (2006.01) |
| B65H 37/06 | (2006.01) |
| B65H 43/08 | (2006.01) |
| B65H 45/12 | (2006.01) |
| B65H 45/30 | (2006.01) |
| G03G 15/00 | (2006.01) |
| H04N 1/00 | (2006.01) |

(52) U.S. Cl.
CPC .............. *B65H 37/06* (2013.01); *B31F 1/08* (2013.01); *B65H 43/08* (2013.01); *B65H 45/12* (2013.01); *B65H 45/30* (2013.01); *G03G 15/65* (2013.01); *H04N 1/00639* (2013.01); *B65H 2557/63* (2013.01); *B65H 2801/27* (2013.01)

(58) Field of Classification Search
CPC ........ B65H 37/06; B65H 43/08; B65H 45/12; B31F 1/08

USPC ............................ 270/32; 493/396, 397, 405
See application file for complete search history.

(56) References Cited

U.S. PATENT DOCUMENTS

| | | | | |
|---|---|---|---|---|
| 7,597,311 B2 * | 10/2009 | Kawata | .................. | B65H 45/18 270/12 |
| 7,740,238 B2 * | 6/2010 | Iijima | ....................... | B42B 4/00 270/32 |
| 7,770,876 B2 * | 8/2010 | Sasahara | ................... | B31F 1/08 270/20.1 |
| 7,913,988 B2 * | 3/2011 | Awano | ...................... | B31F 1/08 270/32 |

(Continued)

FOREIGN PATENT DOCUMENTS

JP        2016-158113 A       9/2016

*Primary Examiner* — Leslie A Nicholson, III
(74) *Attorney, Agent, or Firm* — Sughrue Mion, PLLC

(57) ABSTRACT

An apparatus includes: a unit that provides an instruction on creasing and folding positions on paper set such that the distance between fold crease and fold line positions is meaningful; a unit that acquires a read image by reading paper that has been subjected to creasing and folding processes in accordance with the creasing and folding positions in an open state; a unit that analyzes the read image to detect two streaks corresponding to the fold crease and the fold line from the read image, and that specifies the position of one of the two streaks as the fold crease position and the position of the other as the fold line position on the basis of the creasing and folding positions; and a unit that outputs correction information about at least one of the creasing and folding positions such that the fold crease and fold line positions match each other.

4 Claims, 4 Drawing Sheets

(56) References Cited

U.S. PATENT DOCUMENTS

| | | | |
|---|---|---|---|
| 8,387,964 B2* | 3/2013 | Saito | B65H 45/18 |
| | | | 270/32 |
| 9,604,488 B2* | 3/2017 | Sakata | B31F 1/08 |
| 10,011,138 B2* | 7/2018 | Sakata | B42C 7/005 |

* cited by examiner

IMAGE PROCESSING APPARATUS AND IMAGE PROCESSING METHOD

CROSS-REFERENCE TO RELATED APPLICATIONS

This application is based on and claims priority under 35 USC 119 from Japanese Patent Application No. 2017-200301 filed Oct. 16, 2017.

BACKGROUND

(i) Technical Field

The present invention relates to an image processing apparatus and an image processing method.

(ii) Related Art

In a post-processing device coupled to an image forming device, a process for forming a fold line is occasionally performed after a fold crease is formed. A fold crease is a crease-shaped recess formed in paper before a folding process, and is formed to prevent a toner crack due to folding or make the finish of folding look better.

Since a fold crease and a fold line are occasionally displaced from each other because of a difference in the paper characteristics (such as size, thickness, and stiffness) among types of paper, a position adjustment in which a fold crease and a fold line are aligned with each other is occasionally necessary.

The position adjustment has been performed manually in the related art.

SUMMARY

According to an aspect of the present invention, there is provided an image processing apparatus including: a post-process instruction unit that provides a post-processing device that executes a creasing process and a folding process with an instruction on a creasing position and a folding position on paper, the creasing position and the folding position being set such that a distance between a position of a fold crease formed by the creasing process and a position of a fold line formed by the folding process is a meaningful distance; a reading unit that acquires a read image by reading paper that has been subjected to the creasing process and the folding process which are executed by the post-processing device in accordance with the creasing position and the folding position, the instruction on which is provided by the post-process instruction unit, in an open state; an image analysis unit that analyzes the read image to detect two streaks corresponding to the fold crease and the fold line from the read image, and that specifies a position of one of the two streaks as a fold crease position and a position of the other as a fold line position on a basis of the creasing position and the folding position, the instruction on which is provided by the post-process instruction unit; and a correction information output unit that outputs, to the post-processing device, correction information about at least one of the creasing position and the folding position which are set by the post-process instruction unit such that the fold crease position and the fold line position which are specified match each other.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described below.

First Exemplary Embodiment

Figure 1:
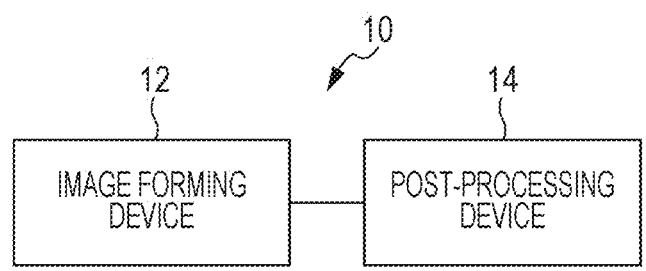
FIG. 1 illustrates a schematic configuration of an image processing system according to an exemplary embodiment.

FIG. 1 illustrates a schematic configuration of an image processing system 10 according to the present exemplary embodiment. The image processing system 10 includes an image forming device 12 that serves as an image processing apparatus, and a post-processing device 14.

The image forming device 12 is a multi-function device that includes a print (printing) function, a scan (image reading) function, a copy function, and so forth. For example, the image forming device 12 processes print data designated in a print job input from a user to form an image on a printing medium such as paper (print function). In addition, the image forming device 12 optically reads a document such as a paper document set by the user to generate image data (scan function). The copy function executes a process for determining image data read using the scan function as print data, and printing the print data using the print function. Printed paper on which printing has been performed using the print function or the like is sent to the post-processing device 14. The image forming device 12 will be discussed in detail later.

Figure 2:
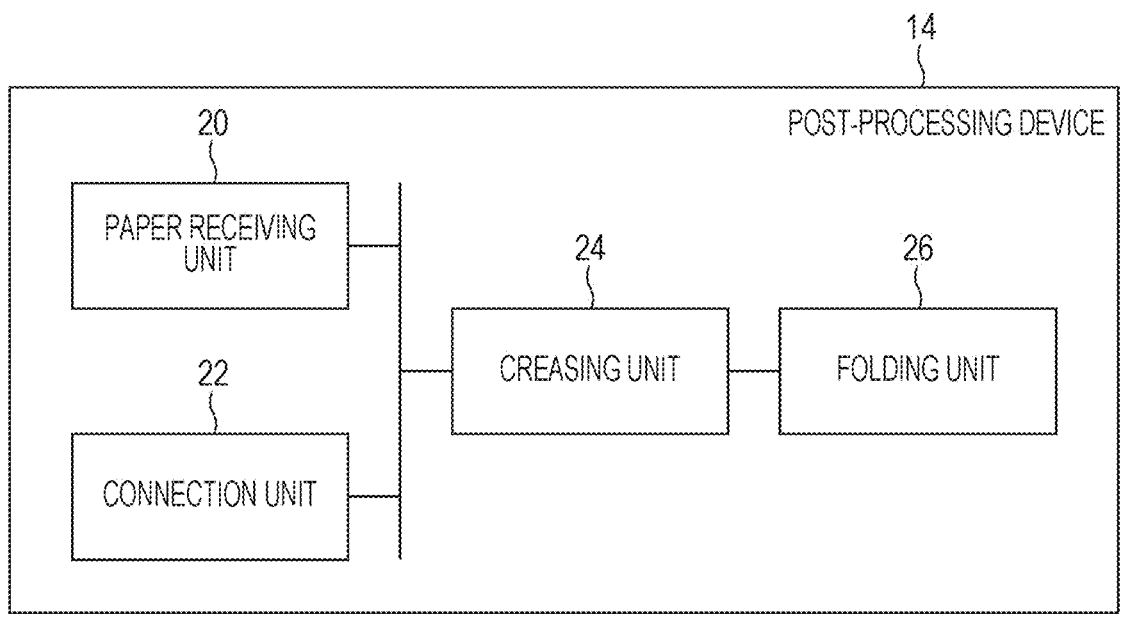
FIG. 2 illustrates a schematic configuration of a post-processing device according to the exemplary embodiment.

FIG. 2 illustrates a schematic configuration of the post-processing device 14.

A paper receiving unit 20 includes a paper feed roller etc., and receives the printed paper from the image forming device 12 and transports the printed paper to a creasing unit 24 to be discussed later.

A connection unit 22 includes a connector etc., for example, and is provided to be connected to the image forming device 12 so as to be communicable. Setting information about a creasing process performed by the creasing unit 24 and setting information about a folding process performed by a folding unit 26 may be received from the image forming device 12 through connection through the connection unit 22.

The creasing unit 24 performs a process for forming a fold crease on the printed paper from the image forming device 12 by performing a creasing process on the printed paper. Specifically, the creasing unit 24 forms a groove in a V or U cross-sectional shape or the like in a surface of the printed paper. By performing a creasing process prior to a folding process performed by the folding unit 26 to be discussed later, occurrence of a toner crack at a fold line may be suppressed, and the finish of the folding process may be made to look better.

The folding unit 26 performs a folding process on the printed paper on which the creasing process has been performed by the creasing unit 24. With the folding unit 26 performing a folding process at the same position as the fold crease which is formed on the printed paper, the finish of the folding process may be made to look better as discussed above. Thus, it is necessary that the position of the folding process which is performed by the folding unit 26 should be aligned with the fold crease position.

In the present exemplary embodiment, the fold crease which is formed by the creasing process which is performed by the creasing unit 24 is provided so as to extend in the short-length direction of the printed paper. The folding unit 26 performs a folding process on the printed paper such that a fold line that extends in the short-length direction of the printed paper is formed at the same position as the fold crease which is provided on the printed paper. In the present exemplary embodiment, in the post-processing device 14, the creasing position and the folding position are adjustable in the longitudinal direction of the printed paper in order to cause the positions of the fold crease and the fold line to coincide with each other. The creasing unit 24 decides the fold crease position in the longitudinal direction of the printed paper on the basis of information transmitted from the image forming device 12. Meanwhile, the folding unit 26 decides the folding position in the longitudinal direction of the printed paper on the basis of information transmitted from the image forming device 12. The fold crease and the fold line may be provided so as to extend in the longitudinal direction of the printed paper. In such a case, the post-processing device 14 adjusts the creasing position and the folding position in the short-length direction of the printed paper.

Figure 3:
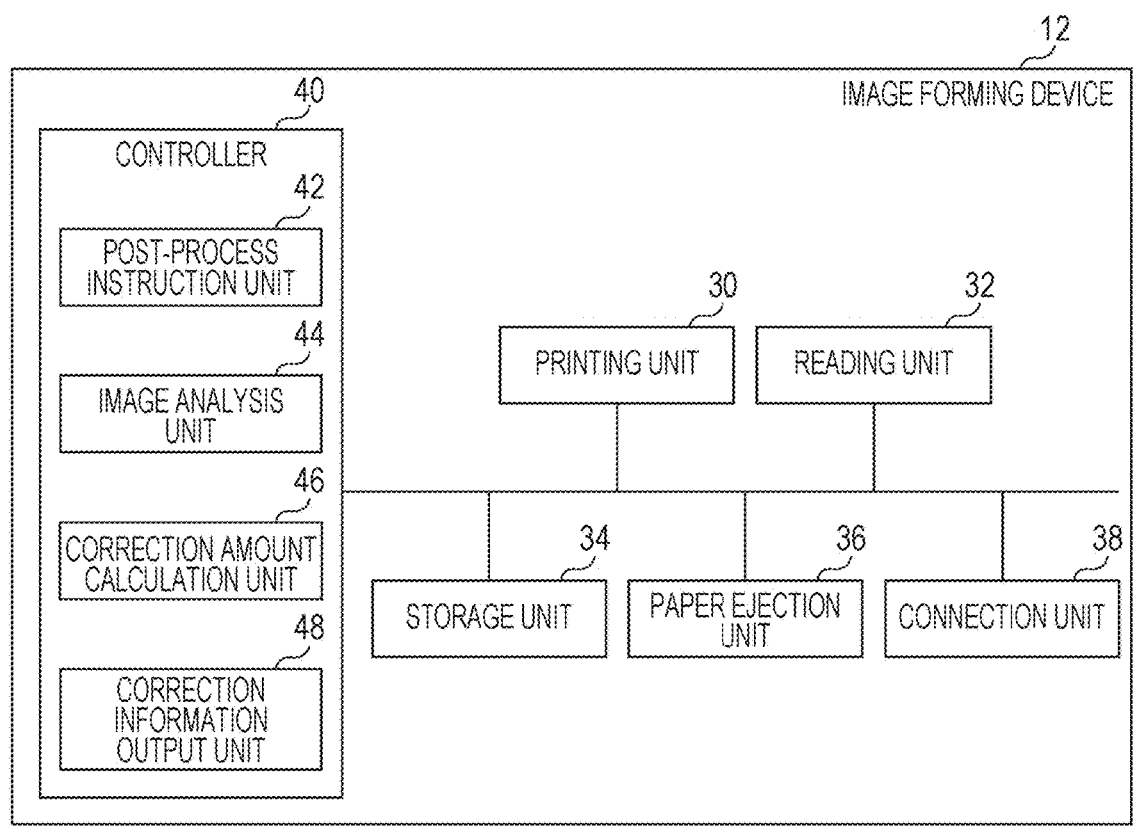
FIG. 3 illustrates a schematic configuration of an image forming device according to the exemplary embodiment.

FIG. 3 illustrates a schematic configuration of the image forming device 12.

A printing unit 30 includes a photosensitive unit, a toner box, a cartridge, a fixing device, and so forth, for example. The printing unit 30 performs a process for printing target print data on a printing medium such as paper in response to a request to execute the print function or the copy function from the user.

A reading unit 32 includes a light source, a charge coupled device (CCD) sensor, platen glass, and so forth, for example. The reading unit 32 optically reads (scans) the document which is set by the user, and performs a process for forming image data.

A storage unit 34 includes a hard disk, a read only memory (ROM), a random access memory (RAM), and so forth, for example. The storage unit 34 stores a program for causing the various units of the image forming device 12 to operate. The storage unit 34 also stores the image data which are formed by the reading unit 32.

A paper ejection unit 36 includes a paper feed roller etc., and ejects the printed paper on which printing has been performed by the printing unit 30 to the post-processing device 14.

A connection unit 38 includes a connector etc., for example, and is provided to be connected to the post-processing device 14 so as to be communicable. Setting information about the creasing process and setting information about the folding process are output to the post-processing device 14 via the connection unit 38.

A controller 40 includes a microprocessor etc., for example, and causes the various units of the image forming device 12 to operate in accordance with the program which is stored in the storage unit 34. As illustrated in FIG. 3, the controller 40 also functions as a post-process instruction unit 42, an image analysis unit 44, a correction amount calculation unit 46, and a correction information output unit 48.

The various functions of the controller 40 execute a correction process (hereinafter referred to simply as a "correction process") for identifying and detecting the positions of the fold crease and the fold line which are formed on the printed paper, and thereafter correcting one of a creasing position, at which a creasing process is performed by the creasing unit 24, and a folding position, at which a folding process is performed by the folding unit 26, such that the creasing position and the folding position are aligned with each other.

The post-process instruction unit 42 sets a creasing position and a folding position on test paper for use in the correction process, prior to the correction process, and transmits instruction information that indicates the creasing position and the folding position which are set to the post-processing device 14. The post-process instruction unit 42 sets the creasing position and the folding position such that the distance (in the present exemplary embodiment, the distance in the longitudinal direction of the test paper) between the position (fold crease position) of the fold crease which is formed by the creasing process and the position (fold line position) of the fold line which is formed by the folding process is a meaningful distance.

An error (hereinafter described as a "fold crease error") may be caused between the creasing position and the actual fold crease position, and an error (hereinafter described as a "fold line error") may be caused between the folding position and the actual fold line position, in accordance with the paper characteristics (such as size, thickness, and stiffness). Then, the phrase "set (the creasing position and the folding position) such that the distance between the fold crease position and the fold line position is a meaningful distance" means that the creasing position and the folding position are set such that the distance between the creasing position and the folding position is longer than the error range of the fold line error (more specifically, the value of the maximum error that the fold crease error may take) and the error range of the fold crease error (more specifically, the value of the maximum error that the fold line error may take). Preferably, the creasing position and the folding position are set such that the distance between the creasing position and the folding position is longer than the total of the value of the maximum error that the fold crease error may take and the value of the maximum error that the fold line error may take. For example, in the case where the error ranges of the fold crease error and the fold line error are about 5 mm at a maximum, the post-process instruction unit 42 sets the distance between the creasing position and the folding position to be at least more than about 10 mm. Normally, the error ranges of the fold crease error and the fold line error are in the order of several millimeters. In the present exemplary embodiment, the creasing position and the folding position are set such that the distance between the creasing position and the folding position is several centimeters to several tens of centimeters.

In the present exemplary embodiment, the post-process instruction unit 42 sets the folding position to a target position (a position at which a folding process should be performed in a principal process performed after the correction process), and thereafter sets the creasing position to a position that is meaningfully away from the set folding position. In the present exemplary embodiment, the folding position is set to the center in the longitudinal direction of the test paper, and the creasing position is set to a position that is closer to an end portion in the longitudinal direction of the test paper. As a matter of course, the post-process instruction unit 42 may set the creasing position to a target position, and thereafter sets the folding position to a position that is meaningfully away from the set creasing position.

The post-process instruction unit 42 temporarily holds positional information that indicates the creasing position and the folding position which are set in the storage unit 34.

When the post-processing device 14 receives instruction information from the post-process instruction unit 42, the creasing unit 24 executes a creasing process on the test paper from the image forming device 12 on the basis of the received instruction information, prior to the correction process. Further, the folding unit 26 executes a folding process on the test paper, on which the creasing process has been performed, on the basis of the received instruction information, prior to the correction process. Consequently, test processed paper is formed. The test paper may be paper that has the same paper characteristics as those of paper to be used in the actual creasing process and the actual folding process to be performed after the correction process.

Then, the reading unit 32 scans the test processed paper in the open state (the test processed paper which has been folded once and is unfolded) to acquire a read image. The acquired read image is temporarily stored in the storage unit 34.

Figure 4:
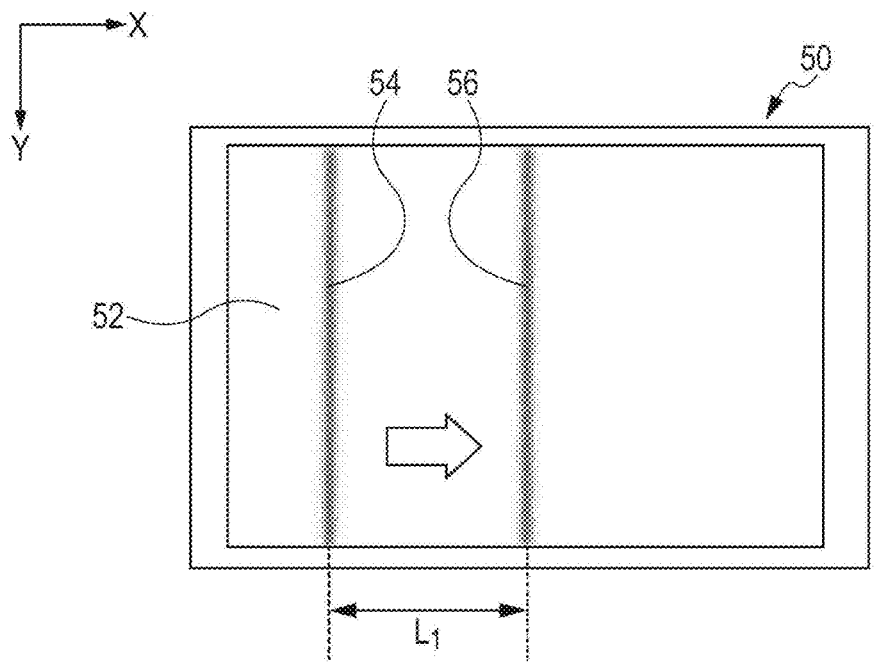
FIG. 4 illustrates an example of a scanned image.

FIG. 4 illustrates an example of a read image 50. As illustrated in FIG. 4, the read image 50 includes a processed paper image 52 corresponding to the test processed paper. In FIG. 4, the longitudinal direction of the processed paper image 52 is defined as an X direction, and the short-length direction which is perpendicular to the X direction is defined as a Y direction. The test processed paper has been subjected to the creasing process and the folding process, and therefore includes two streaks (streak images) 54 and 56 corresponding to the fold crease and the fold line. In the present exemplary embodiment, as discussed above, the fold crease and the fold line are provided so as to extend in the short-length direction of the test processed paper, and therefore the streaks 54 and 56 are images that extend in the short-length direction (Y direction).

The image analysis unit 44 detects the two streaks 54 and 56 included in the read image and corresponding to the fold crease and the fold line by performing an image analysis process on the read image 50. The streaks 54 and 56 may be detected on the basis of the contrast (difference) in the pixel value (brightness or color) in the processed paper image 52, for example. For example, if a column of pixels that have pixel values distinguished from those of other portions extends over a certain distance in the Y direction in the processed paper image 52, such a pixel column may be determined to constitute the streak 54 or 56. In order to make the streaks 54 and 56 better detectable, the printing unit 30 may print the test paper such that a certain region that includes the fold line and a certain region that includes the fold crease are filled with a patch in a single color (e.g. black). Consequently, the contrast in the pixel value between the streaks 54 and 56 and pixels around the streaks 54 and 56 may be enhanced in the processed paper image 52, as a result of which the streaks 54 and 56 are made better detectable.

Figure 5:
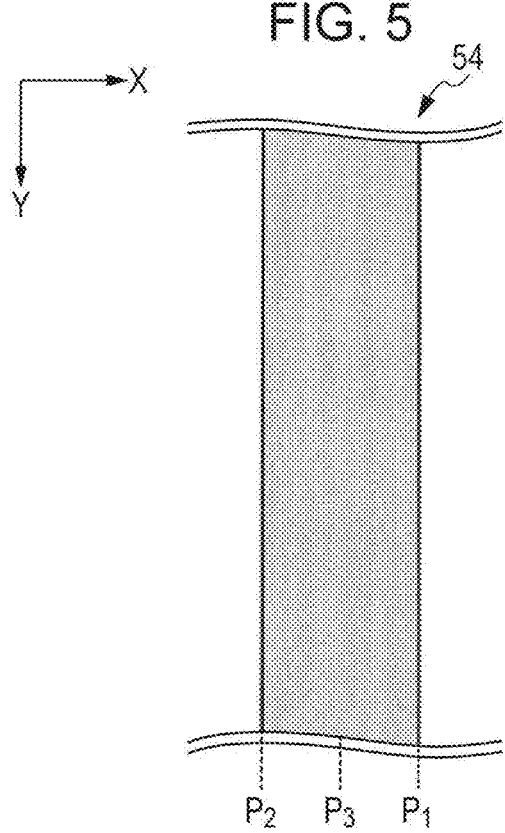
FIG. 5 is an enlarged view of a streak included in the scanned image.

In addition, the image analysis unit 44 detects the positions of the streaks 54 and 56. In the present exemplary embodiment, the positions of the streaks 54 and 56 are the X-direction positions of the streaks 54 and 56. FIG. 5 illustrates an enlarged partial view of the streak 54. As illustrated in FIG. 5, the streak 54 has a certain width. Thus, the right edge ($P_1$ in FIG. 5) or the left edge ($P_2$ in FIG. 5) of the streak 54, for example, may be adopted as the X-direction position of the streak 54. However, the width of the streak 54 may be fluctuated by the paper characteristics, or the strength of folding etc. for a fold line. Thus, in order the minimize the error in the X-direction position of the streak 54 due to fluctuations in the width of the streak 54, the center position ($P_3$ in FIG. 5) of the width of the streak 54 is preferably used as the X-direction position of the streak 54. The center position of the width of the streak 54 may be detected as a position that is equidistant from the right edge and the left edge of the streak 54. While one streak 54 is described here, the same also applies to the other streak 56.

When the X-direction positions of the streaks 54 and 56 are detected, the image analysis unit 44 detects the X-direction distance ($L_1$ in FIG. 4) between the streak 54 and the streak 56.

As illustrated in FIG. 4, the streak 54 corresponding to the fold crease and the streak 56 corresponding to the fold line are rather similar to each other, and therefore it is difficult to distinguish which of the two streaks 54 and 56 corresponds to the fold crease or the fold line. Thus, in the present exemplary embodiment, the image analysis unit 44 specifies one of the two streaks 54 and 56 as an image corresponding to the fold crease, and specifies the other as an image corresponding to the fold line, on the basis of the positional information which is stored in the storage unit 34 and which indicates the creasing position and the folding position which are set by the post-process instruction unit 42.

In the present exemplary embodiment, as discussed above, the post-process instruction unit 42 sets the folding position to the center in the longitudinal direction of the test paper, and sets the creasing position to a position that is meaningfully away from the folding position, specifically a position that is closer to an end portion in the longitudinal direction of the test paper. Thus, the image analysis unit 44 specifies the streak 54, which is positioned on the side of an end portion in the longitudinal direction (X direction) of the processed paper image 52, as an image corresponding to the fold crease, and specifies the other streak 56, that is, the streak 56 which is positioned at the center in the longitudinal direction (X direction) of the processed paper image 52, as an image corresponding to the fold line. Consequently, the position of the streak 54 is specified as the fold crease position, and the position of the streak 56 is specified as the fold line position.

The correction amount calculation unit 46 calculates correction information about at least one of the creasing position and the folding position on the basis of the fold crease position and the fold line position which are detected by the image analysis unit 44 from the read image 50. Particularly, correction information is calculated such that the X-direction positions of the streak 54, which is specified as corresponding to the fold crease, and the streak 56, which is specified as corresponding to the fold line, match each other. In the present exemplary embodiment, the folding position is set to a target position, and the creasing position is set to a position that is meaningfully away from the folding position. Therefore, the correction amount calculation unit 46 calculates correction information about the creasing position. In the present example, the correction amount calculation unit 46 determines the positive side in the X direction in FIG. 4 as the correction direction, and calculates an amount that matches $L_1$ as the correction amount. The relationship between the correction amount and the X-direction distance $L_1$ may be decided, as appropriate, in accordance with the image size etc. of the read image 50.

In the present exemplary embodiment, the folding position is not corrected, and only the creasing position is corrected. In the case where it may be determined that the position of the fold line is displaced from the target position as a result of detecting the position of the streak 56 corresponding to the fold line, however, the folding position may be corrected to the target position, and thereafter the creasing position may be corrected so as to match the corrected folding position. For example, in the example of FIG. 4, in the case where the folding position is corrected such that the streak 56 corresponding to the fold line is moved by $L_2$ toward the positive side in the X direction, the correction amount calculation unit 46 calculates an amount that matches $L_1+L_2$ as the correction amount for the creasing position.

The correction information output unit 48 outputs the correction information about at least one of the creasing position and the folding position, which is calculated by the correction amount calculation unit 46, to the post-processing device 14. The correction information includes the correction direction and the correction amount for at least one of the creasing position and the folding process (in the present exemplary embodiment, the creasing position).

The creasing unit 24 of the post-processing device 14 corrects the creasing position on the basis of the correction information. Consequently, the fold crease position and the folding position may be caused to match each other.

An overview of the configuration of the image processing system 10 according to the present exemplary embodiment has been described above. In the present exemplary embodiment, when forming the test processed paper, the creasing position and the folding position are set such that the distance between the fold crease position and the fold line position is a meaningful distance. One of the two streaks 54 and 56 which are detected from the read image 50 may be specified as an image corresponding to the fold crease, and the other may be specified as an image corresponding to the fold line, on the basis of the creasing position and the folding position which are set in this manner.

Figure 6:
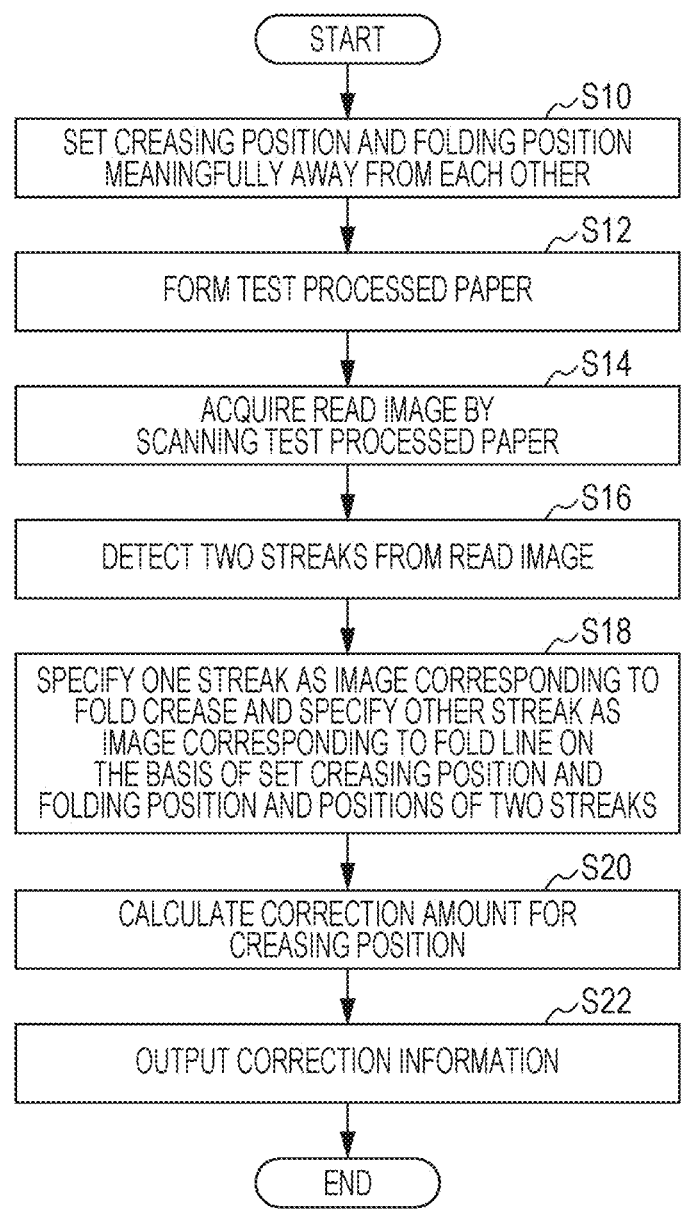
FIG. 6 is a flowchart illustrating the flow of a process performed by the image processing system according to the exemplary embodiment.

The flow of a process performed by the image processing system 10 according to the present exemplary embodiment will be described below with reference to the flowchart illustrated in FIG. 6.

In step S10, the post-process instruction unit 42 sets a creasing position and a folding position meaningfully away from each other. In the present example, the folding position is set to the center position in the longitudinal direction of the test paper which is a target position, and the creasing position is set to the side of an end portion in the longitudinal direction of the test paper. The post-process instruction unit 42 transmits instruction information that indicates the creasing position and the folding position which are set to the post-processing device 14, and holds positional information that indicates the creasing position and the folding position which are set in the storage unit 34.

In step S12, the creasing unit 24 sets a creasing position on the basis of the received instruction information, and executes a creasing process on the test paper from the image forming device 12. Further, the folding unit 26 sets a folding position on the basis of the received instruction information, and executes a folding process on the test paper which has been subjected to the creasing process. Consequently, test processed paper is formed.

In step S14, the reading unit 32 acquires a read image 50 by scanning the test processed paper in the open state.

In step S16, the image analysis unit 44 detects two streaks 54 and 56 by performing an image analysis on the read image 50. At the same time, the image analysis unit 44 detects the X-direction positions of the two streaks 54 and 56.

In step S18, the image analysis unit 44 specifies one streak 54 as an image corresponding to the fold crease, and specifies the other streak 56 as an image corresponding to the fold line, on the basis of the positional information which is held in the storage unit 34 in step S10 and the positions of the two streaks 54 and 56 which are detected in step S16. Consequently, the fold crease position and the fold line position are specified in the read image 50.

In step S20, the correction amount calculation unit 46 calculates a correction direction and a correction amount for the creasing position on the basis of the fold crease position and the fold line position which are detected in step S18 such that the fold crease position matches the fold line position. In the example of FIG. 4, the correction direction is specified as the positive side in the X direction, and a distance that matches $L_1$, which is the distance between the streaks 54 and 56, is calculated as the correction amount.

In step S22, the correction information output unit 48 outputs correction information that includes the correction direction and the correction amount which are specified in step S20 to the post-processing device 14.

While an exemplary embodiment of the present invention has been described above, the present invention is not limited to the above exemplary embodiment, and may be modified in various ways without departing from the scope and spirit of the present invention. For example, the image processing apparatus according to the present invention is the image forming device 12 in the description of the present exemplary embodiment. However, the image processing apparatus according to the present invention is not limited to the image forming device 12, and may be other devices that include at least the post-process instruction unit 42, the image analysis unit 44, the correction amount calculation unit 46, and the correction information output unit 48.

What is claimed is:

1. An image processing apparatus comprising:
a memory configured to store program instructions;
a processor that when executing the program instructions implements:
a post-process instruction unit that provides a post-processing device that executes a creasing process and a folding process with an instruction on a creasing position and a folding position on paper, the creasing position and the folding position being set such that a distance between a position of a fold crease formed by the creasing process and a position of a fold line formed by the folding process is a meaningful distance;
a reading unit that acquires a read image by reading a first paper in an open state and that has been subjected to the creasing process and the folding process which are executed by the post-processing device in accordance with the creasing position and the folding position;
an image analysis unit that analyzes the read image to detect two streaks corresponding to the fold crease and the fold line from the read image, and that specifies a position of one of the two streaks as a fold crease position and a position of the other as a fold line position on a basis of the creasing position and the folding position; and
a correction information output unit that generates correction information based on the two detected streaks and comprises information about at least one of the creasing position and the folding position, and outputs the correction information to the post processing device, wherein the post-process instruction unit sets at least one of the creasing position and the folding position based on the correction information such that the fold crease position and the fold line position which are specified match each other when the post processing device executes the creasing process and the folding process on a second paper.

2. The image processing apparatus according to claim 1, wherein the post-process instruction unit sets the creasing position and the folding position to the meaningful distance such that the distance between the creasing position and the folding position is longer than an error range of an actual fold crease position with respect to the creasing position and an error range of an actual fold line position with respect to the folding position.

3. The image processing apparatus according to claim 1, wherein the two streaks included in the read image have a width, and
the image analysis unit specifies a center position of a width of one of the two streaks as the fold crease position, and specifies a center position of a width of the other as the fold line position.

4. An image processing method comprising:
a post-processing device executing a creasing process at a creasing position on a paper and a folding process at a folding position on the paper, the creasing position and the folding position being set such that a distance between a position of a fold crease formed by the creasing process and a position of a fold line formed by the folding process is a meaningful distance;
acquiring a read image by reading, in an unfolded state, a first paper that has been subjected to the creasing process and the folding process which are performed by the post-processing device in accordance with the creasing position and the folding position;
analyzing the read image to detect two streaks corresponding to the fold crease and the fold line from the read image, and specifying a position of one of the two streaks as a fold crease position and a position of the other as a fold line position on a basis of the creasing position and the folding position, and generating correction information based on the two detected streaks and comprises information about at least one of the creasing position and the folding position;
outputting, to the post-processing device, the correction information; and
the post-processing device setting the creasing position and folding position based on the correction information such that the fold crease position and the fold line position which are specified match each other when the post processing device executes the creasing process and the folding process on a second paper.

* * * * *